(12) United States Patent
Hopwood et al.

(10) Patent No.: US 11,664,163 B2
(45) Date of Patent: May 30, 2023

(54) CAPACITOR HAVING AN ELECTRICAL TERMINATION

(71) Applicant: Knowles (UK) Ltd, Norwich (GB)

(72) Inventors: Stephen Hopwood, Norwich (GB); Angela Ellmore, Norwich (GB); David Beckett, Norwich (GB)

(73) Assignee: KNOWLES (UK) LTD., Norfolk (GB)

( * ) Notice: Subject to any disclaimer, the term of this patent is extended or adjusted under 35 U.S.C. 154(b) by 0 days.

(21) Appl. No.: 16/439,612

(22) Filed: Jun. 12, 2019

(65) Prior Publication Data

US 2019/0385796 A1    Dec. 19, 2019

(30) Foreign Application Priority Data

Jun. 14, 2018    (GB) ...................................... 1809764

(51) Int. Cl.
*H01G 4/228*    (2006.01)
*H01G 4/30*    (2006.01)
(Continued)

(52) U.S. Cl.
CPC ............. *H01G 4/228* (2013.01); *H01G 4/242* (2013.01); *H01G 4/30* (2013.01); *H01G 4/005* (2013.01); *H01G 4/12* (2013.01)

(58) Field of Classification Search
CPC ........... H01G 4/242; H01G 4/228; H01G 4/30
See application file for complete search history.

(56) References Cited

U.S. PATENT DOCUMENTS

| 1,537,660 A | * | 5/1925 | Dubilier | ................. | H01G 4/232 |
| | | | | | 361/307 |
| 3,181,044 A | * | 4/1965 | Duncan | .............. | H01R 13/7197 |
| | | | | | 361/302 |

(Continued)

FOREIGN PATENT DOCUMENTS

| FR | 1347964 A | 1/1964 |
| JP | S41-015373 B | 8/1966 |

(Continued)

OTHER PUBLICATIONS

Combined Search and Examination Report, GB1809764.2, Knowles (Uk) Limited (dated Oct. 10, 2018).

(Continued)

*Primary Examiner* — David M Sinclair
(74) *Attorney, Agent, or Firm* — Foley & Lardner LLP (57) ABSTRACT

A capacitor comprises a body of dielectric material in which an anode and a cathode are arranged in a stack. A capacitance-forming layer of the dielectric material is arranged between the anode and the cathode. The capacitor further comprises an electro-mechanical connection, which comprises a hole which extends into the body in the direction of the stack. The hole includes an electrical connector. The electrical connector is in electrical contact with either the anode or the cathode, comprises a compliant element, and is suitable for holding a contact pin. The compliant element is configured to decouple the body from mechanical forces applied to the contact pin. The compliant element reduces mechanical stresses experienced by the body of the capacitor. Also provided is a capacitor assembly comprising two or more such capacitors; a kit for assembling such capacitors, and the use of an electrical termination to protect a capacitor from stress.

11 Claims, 6 Drawing Sheets

(51) Int. Cl.
  *H01G 4/242* (2006.01)
  *H01G 4/005* (2006.01)
  *H01G 4/12* (2006.01)

(56) References Cited

U.S. PATENT DOCUMENTS

| | | | |
|---|---|---|---|
| 3,184,661 A | 5/1965 | Weller et al. | |
| 3,200,355 A * | 8/1965 | Dahlen | H01R 13/7197 333/183 |
| 3,260,907 A * | 7/1966 | Weller | H01G 4/232 361/321.1 |
| 4,083,022 A * | 4/1978 | Nijman | H01R 13/7195 333/183 |
| 4,083,622 A * | 4/1978 | Neidecker | H01R 13/187 439/86 |
| 4,128,293 A * | 12/1978 | Paoli | H01R 13/187 439/927 |
| 4,741,710 A * | 5/1988 | Hogan | H01R 13/7195 333/185 |
| 5,055,055 A * | 10/1991 | Bakker | H01R 13/6315 439/78 |
| 5,153,540 A * | 10/1992 | Gliha, Jr. | H01G 4/38 333/182 |
| 6,456,481 B1 * | 9/2002 | Stevenson | A61N 1/3754 361/302 |
| 6,567,259 B2 * | 5/2003 | Stevenson | A61N 1/3754 361/302 |
| 7,591,682 B2 * | 9/2009 | Umemura | H01R 13/426 439/598 |
| 2002/0158307 A1 * | 10/2002 | Honda | H01G 4/30 257/532 |
| 2005/0190527 A1 | 9/2005 | Stevenson et al. | |
| 2006/0085043 A1 * | 4/2006 | Stevenson | H01G 4/35 607/36 |
| 2006/0221543 A1 | 10/2006 | Stevenson et al. | |
| 2008/0198530 A1 * | 8/2008 | Zhao | A61N 1/3754 361/307 |
| 2012/0309237 A1 * | 12/2012 | Marzano | A61N 1/3754 439/675 |
| 2016/0254093 A1 * | 9/2016 | Baechle | H01G 4/203 361/301.4 |
| 2017/0291034 A1 * | 10/2017 | Marzano | H01G 4/35 |
| 2019/0326061 A1 * | 10/2019 | Tomizawa | H01G 4/005 |

FOREIGN PATENT DOCUMENTS

| | | |
|---|---|---|
| JP | S5315558 | 2/1978 |
| JP | 60-057212 B | 12/1985 |
| JP | 07-014637 U | 3/1995 |
| JP | 2006222440 A * | 8/2006 |
| WO | WO 2013/186172 | 12/2013 |
| WO | WO 2015/124698 | 8/2015 |

OTHER PUBLICATIONS

Combined Search and Examination Report issued in corresponding GB Application No. 2011589.5 dated Sep. 25, 2020.
Examination Report issued in corresponding GB Application No. 2011589.5 dated Apr. 8, 2021.
Liang et al.: "3D Stretchable, Compressible, and Highly Conductive Metal-Coated Polydimethylsiloxane Sponges" Advanced Materials Technologies; Aug. 12, 2016; 2 Pages; vol. 1, Issue 7 1600117; https://doi.org/10.1002/admt.201600117.
First Office Action for CN Appl. Ser. No. 201910509787.7 dated May 19, 2021 (17 pages).
First Office Action for JP Appl. No. 2019-104916, dated May 25, 2021.
Office Action issued in Japanese Patent Application No. 2019-104916, dated Dec. 7, 2021 and its English translation thereof (7 pages).

* cited by examiner

CAPACITOR HAVING AN ELECTRICAL TERMINATION

CROSS-REFERENCE TO RELATED APPLICATIONS

This application claims the benefit of and priority to United Kingdom Patent Application No. 1809764.2, filed Jun. 14, 2018, the entire contents of which are incorporated herein by reference.

TECHNICAL FIELD

The present disclosure generally relates to a capacitor, to a capacitor assembly comprising two or more capacitors, to a kit for assembling a capacitor, and to the use of an electro-mechanical connection to protect a multi-layer capacitor from mechanical stress.

BACKGROUND

A capacitor includes at least one capacitive layer of a dielectric material provided between a pair of electrodes of opposing polarities. A multi-layer construction, having multiple capacitive layers arranged between respective electrode pairs is also possible. Capacitors also include electrical terminations for connecting electrically the electrodes to other components of a circuit. For example, the electrodes may have exposed edges, with the terminations taking the form of end caps in electrical contact with the exposed edges.

The dielectric materials used in capacitors are often brittle materials, such as ceramics. Consequently, capacitors are particularly susceptible to damage by mechanical stresses. Size is a factor in determining susceptibility to damage. Generally speaking, the larger the part, the more susceptible to damage it will be. This restricts the size of part which may be practically used, and in turn imposes limitations on working voltages and the maximum capacitance. In the past, the size of a multi-layer capacitor which may be mounted directly to a circuit board has usually been limited to about 6.35 mm by 12.7 mm (i.e. 0.25" by 0.5").

Mechanical stresses may be encountered during the assembly of a circuit containing the capacitor, and/or subsequently, during use of the circuit. For example, a circuit board may be subject to vibrations or bumps. Vibrations are a particular problem for circuit boards used in motor vehicles or aircraft.

One approach for protecting multi-layer capacitors from damage is to attach a lead frame. A lead frame is a metal structure which holds the capacitor and absorbs external stresses, thereby protecting it from damage. A potential drawback of this approach is that it can be difficult to attach a lead frame to a multi-layer capacitor. Aligning the capacitor with the lead frame can be problematic. It may be necessary to use high-temperature solder to connect the capacitor to the lead frame.

There is a need in the art for an improved approach to protecting multi-layer capacitors from damage by mechanical stresses.

SUMMARY

In one aspect, the present disclosure provides a capacitor comprising:
 a body of dielectric material in which at least one anode and at least one cathode are arranged in a stack with at least one capacitance-forming layer of the dielectric material arranged between the at least one anode and the at least one cathode in the stack; and
 an electro-mechanical connection;
 wherein the electro-mechanical connection comprises:
  at least one hole which extends into the body in the direction of the stack,
  the at least one hole including an electrical connector, wherein the electrical connector is in electrical contact with either the at least one anode or the at least one cathode; and
  wherein the electrical connector comprises a compliant element and is suitable for holding a contact pin, the compliant element being configured to decouple the body from mechanical forces applied to the contact pin when the electrical connector is holding the contact pin.

When the capacitor is in situ in a circuit, the electrical connector holds the contact pin. However, the capacitor may be provided separately from the contact pin and the contact pin may be fitted when the capacitor is assembled into the circuit. The contact pin may be provided by the same provider as the capacitor or a different provider.

The compliant element serves to protect the body of the capacitor from damage. If, for example, the capacitor is mounted on a circuit board via a contact pin and the circuit board then experiences impact or vibration, those forces are accommodated by the compliant element which enables the contact pin to move relative to the body. For example, the compliant element may bend or flex. The compliant element acts to reduce the magnitude of the force which is transmitted to the body of the capacitor, in turn preventing damage to the capacitor.

The at least one anode may comprise a plurality of anodes and the at least one cathode may comprise a plurality of cathodes. In this arrangement, the anodes and cathodes are arranged in an alternating stack, with a layer of the dielectric material arranged between each cathode and anode pair. In other words, the capacitor may be a multi-layer capacitor. A multi-layer capacitor may be more compact in plan than a single-layer capacitor of the same capacitance.

The at least one hole may be a plurality of holes. Providing a plurality of holes and a plurality of associated electrical connectors may allow mechanical forces to be distributed over a larger area, thereby reducing the risk of damage to the capacitor even further. The holes may be arranged in a row spaced from one edge of the respective electrodes.

The capacitor may further comprise:
 a second electro-mechanical connection;
 wherein the second electro-mechanical connection comprises:
  at least one second hole which extends into the body in the direction of the stack, the at least one second hole being provided with a second electrical connector, wherein the second electrical connector is in electrical contact with the other of the at least one anode and the at least one cathode; wherein the second electrical connector comprises a compliant element and is suitable for holding a further contact pin, the compliant element being configured to decouple the body from mechanical forces applied to the further contact pin when the second electrical connector is holding the further contact pin. The first electro-mechanical connection and the second electro-mechanical connection may be arranged along opposed edges of the capacitor. Providing both sets of electrodes with an electro-mechanical connection as described herein may better prevent damage to the capacitor. Using the same type of termination for both sets of electrodes may also simplify construction of the capacitor.

For example, the capacitor may include a first electro-mechanical connection for the at least one anode and a second electro-mechanical connection for the at least one cathode. The first electro-mechanical connection and the second electro-mechanical connection may each include a plurality of holes extending into the body in the direction of the stack. The holes are provided with respective electrical connectors. The electrical connectors are each suitable for holding a respective contact pin, and each comprise a compliant element configured to decouple the body from mechanical forces applied to the respective contact pin when the electrical connectors hold the contact pins. The first electrical termination and the second electrical termination may be arranged along opposed edges of the capacitor.

The body may include an edge margin surrounding perimeters of the at least one anode and the at least one cathode. Since electrical termination of the electrodes is achieved using the hole and electrical connector, it is not necessary for the electrodes to have an exposed edge on the outside of the body.

The dielectric material may be a ceramic. In other words, the capacitor may be a ceramic capacitor. One example of a preferred dielectric material comprises bismuth ferrite, strontium titanate and barium titanate, as is described in detail in WO2015/124698. Many ceramic materials are brittle, and easily damaged by mechanical stress. The electrical termination as described herein is therefore particularly well-suited for capacitors constructed from ceramic materials.

The at least one hole may extend through either the at least one anode or the at least one cathode. If the hole extends through the relevant electrode, then the surface area available for contact between the electrode and the electrical connector is maximised. Alternatively, the at least one hole may communicate with an edge of the electrode.

The electrodes may be arranged so as to define a region in which the at least one anode does not overlap the at least one cathode in plan, with the hole extending through the region. For example, the at least one anode may be partially offset from the at least one cathode in a horizontal direction so as to define the region. This configuration may allow the straightforward formation of the hole during manufacture.

The hole may have an electrically-conductive bore. For example, the bore of the hole may be provided with a conductive sleeve or coating. An electrically-conductive bore enables multiple electrodes of the same polarity (anodes or cathodes) in a stack to be terminated. An electrically-conductive bore may provide good electrical contact with an electrical connector when the electrical connector is provided as a further component. Alternatively, the electrically-conductive bore may include the compliant conductive element, in which case the electrically-conductive bore acts as the electrical connector. For example, the electrically-conductive bore may include a coating of a compressible conductive material such as an electrically-conductive polymer. Alternatively, the bore may be provided with a conductive sleeve, the sleeve comprising one or more compliant conductive elements.

The compliant element may comprise fingers for holding the contact pin. Various examples of compliant elements include flaps; fingers; and flat springs, in particular flat cantilever springs (also referred to as canted springs).

The electrical connector may include a sleeve. The sleeve may take the form of a hollow tube. The sleeve may provide good electrical contact with the electrodes, optionally via the conductive coating on the bore if present.

The electrical connector may be in the form of a canted spring. The electrical connector may be of a beryllium-copper alloy. Beryllium-copper alloys may have good conductivity and resistance to repeated mechanical stress, and are particularly well-suited for constructing compliant conductive elements. Other flexible sprung metals may be used.

The electrical connector may be held in the hole by a friction fit. This may simplify manufacture. Alternatively, the electrical connector is held in the hole by solder or an adhesive. This may provide strong bonding between the electrical connector and the hole.

The compliant conductive element may be configured to hold the contact pin by a friction fit. This may simplify manufacture. Alternatively, the contact pin may be held in the electrical connector by solder or an adhesive. This may provide strong bonding between the contact pin and the electrical connector.

Two or more electrical connectors may be arranged in the hole. The use of multiple connectors may allow a contact pin to be held more securely.

The hole may be a through-hole extending between a top face of the body and a bottom face of the body. Configuring the hole as a through-hole allows for the construction of a capacitor assembly comprising two or more capacitors arranged in a stack. In the assembly, holes of the capacitors are aligned along a common axis, and a common contact pin extends through the aligned holes along the axis to connect together the multi-layer capacitors. The capacitor assembly is a further aspect of the disclosure.

In a still further aspect, the present disclosure provides a kit for assembling a capacitor, which kit comprises:
 a capacitive component;
 an electrical connector; and
 a contact pin;
wherein the capacitive component comprises:
 a body of dielectric material in which at least one anode and at least one cathode are arranged in a stack with at least one capacitance-forming layer of the dielectric material arranged between the at least one anode and the at least one cathode in the stack; and
 at least one hole extending into the body in the stack and in communication with either the at least one anode or the at least one cathode;
 wherein the electrical connector is capable of being arranged in the hole in electrical contact with either the at least one anode or the at least one cathode and is suitable for holding the contact pin in the hole, and
 the electrical connector comprises a compliant element configured, in the assembled capacitor, to decouple the body from mechanical forces applied to the contact pin. The kit is useful for assembling a capacitor as defined herein.

As will be appreciated, the various features of the capacitor as described above may also be embodied in the kit.

For example, the at least one hole may be a through hole and the contact pin may have a length greater than twice a height of the capacitive component, such that the contact pin is capable of extending through two or more capacitive components arranged in a stack. This kit would be useful for assembling a capacitor assembly as defined herein.

Another aspect of the disclosure provides a use of an electro-mechanical connection to protect a capacitor from stress caused by mechanical forces, wherein the electro-mechanical connection comprises:
 a hole extending into a body of a capacitor, wherein the body is of dielectric material and at least one anode and at least one cathode are arranged in the body in a stack with a capacitance-forming layer of the dielectric material arranged between the at least one anode and the at least one cathode in the stack;

an electrical connector provided in the hole;

wherein the electrical connector is in electrical contact with either the at least one anode or the at least one cathode; and wherein the electrical connector holds a contact pin and includes a compliant element which decouples the body from the mechanical stress.

The mechanical stress may be, for example, caused by a vibration. Vibrations are commonly encountered in moving motor vehicles and aircraft, due to a vehicle engine or motion of the vehicle. The capacitors described herein are particularly useful in motor vehicles, particularly hybrid or electric motor vehicles.

The capacitor in which the electro-mechanical connection is used may have any of the various features described above with reference to the capacitor aspect of the disclosure. In particular, the capacitor may be a multi-layer capacitor having a plurality of anodes and a plurality of cathodes.

BRIEF DESCRIPTION OF THE DRAWINGS

The present solution will become more fully understood from the detailed description and the accompanying drawings, in which:

FIG. 3b is a partial cross-section of a multi-layer capacitor, showing details of a variant of the electrical connector of FIG. 3a;

The drawings are schematic, and are not to scale. In particular, the relative proportions of the electro-mechanical connection have been exaggerated to show the details of the connection.

DETAILED DESCRIPTION

Directional terms such as "top", "bottom", "horizontal" and "vertical" are used herein for convenience of description and relate to the capacitor in the orientation shown in the drawings. For the avoidance of any doubt, this terminology is not intended to limit the orientation of the capacitor in an external frame of reference.

The terms "anode" (or "positive electrode") and "cathode" (or "negative electrode") are used for convenience of description to distinguish between the two sets of electrodes present in the multi-layer capacitor. In the described examples, the anodes and cathodes differ only in that they connect to electro-mechanical connections of different polarities, i.e. the anodes are connected to a first electro-mechanical connection and the cathodes are connected to a second electro-mechanical connection. The multi-layer capacitors as described herein may be used with a direct current supply or an alternating current supply, as desired.

As used herein, the term 'hole' refers to any opening or passage into or through the body and which is able to accommodate the electrical connector.

An example of a multi-layer capacitor in accordance with an embodiment of the solution will now be described with reference to FIGS. 1a, 1b, and 2a and 2b.

Figure 2A:
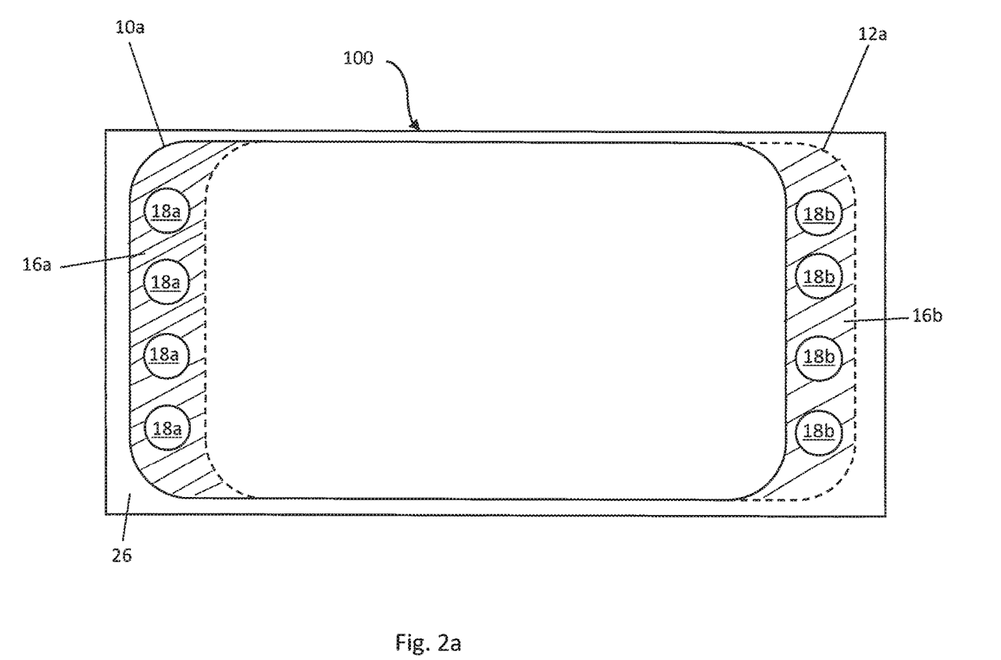
FIG. 2a is a planform view of the multi-layer capacitor of FIG. 1.
Figure 2B:
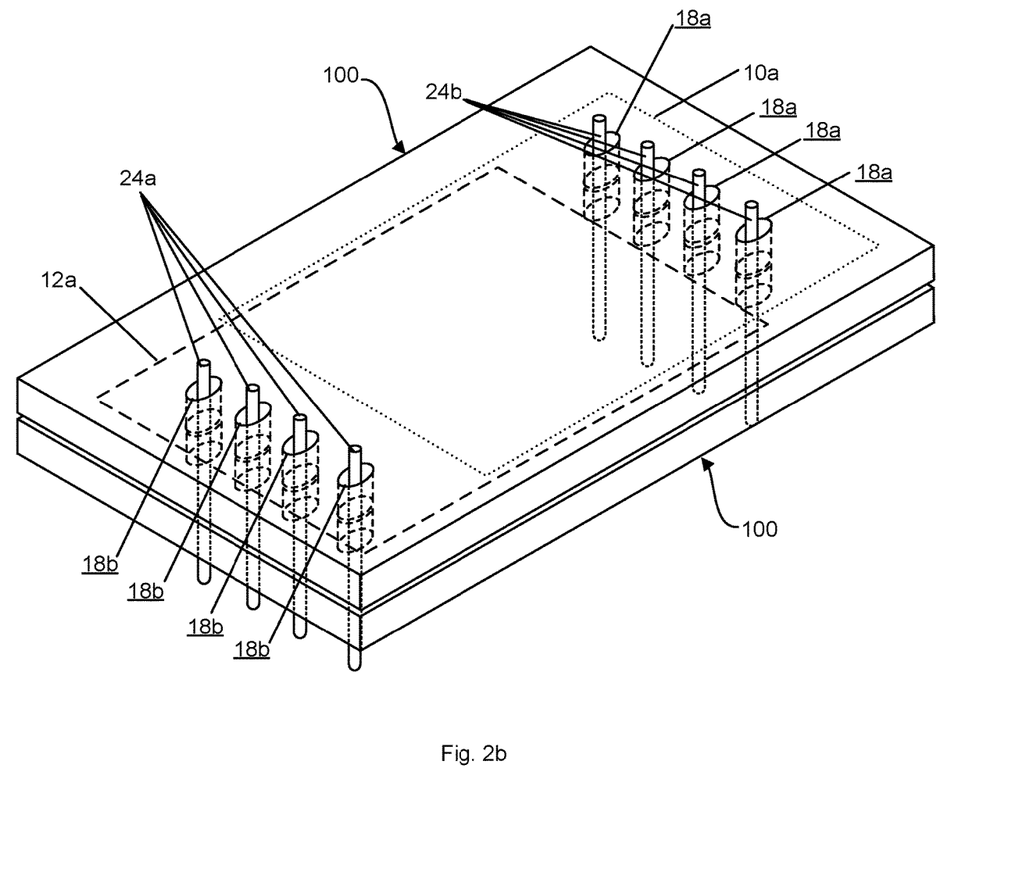
FIG. 2b is a perspective view of the multi-layer capacitor of FIG. 1, showing part of the internal structure of the capacitor.

FIG. 2a and 2b show the external structure of the capacitor 100. FIG. 2b shows a perspective view of the capacitor 100. The capacitor 100 has a body of dielectric material having two sets of opposed holes 18a, 18b passing therethrough. The holes 18a and 18b form part of electromechanical connectors, as will be explained in more detail below. Electrodes which comprise anodes 10a-10c and cathodes 12a-12c are provided within the body of the capacitor. Only the uppermost anode 10a (dotted line) and the uppermost cathode 12a (dashed line) are illustrated in FIG. 2b.

Figure 1A:
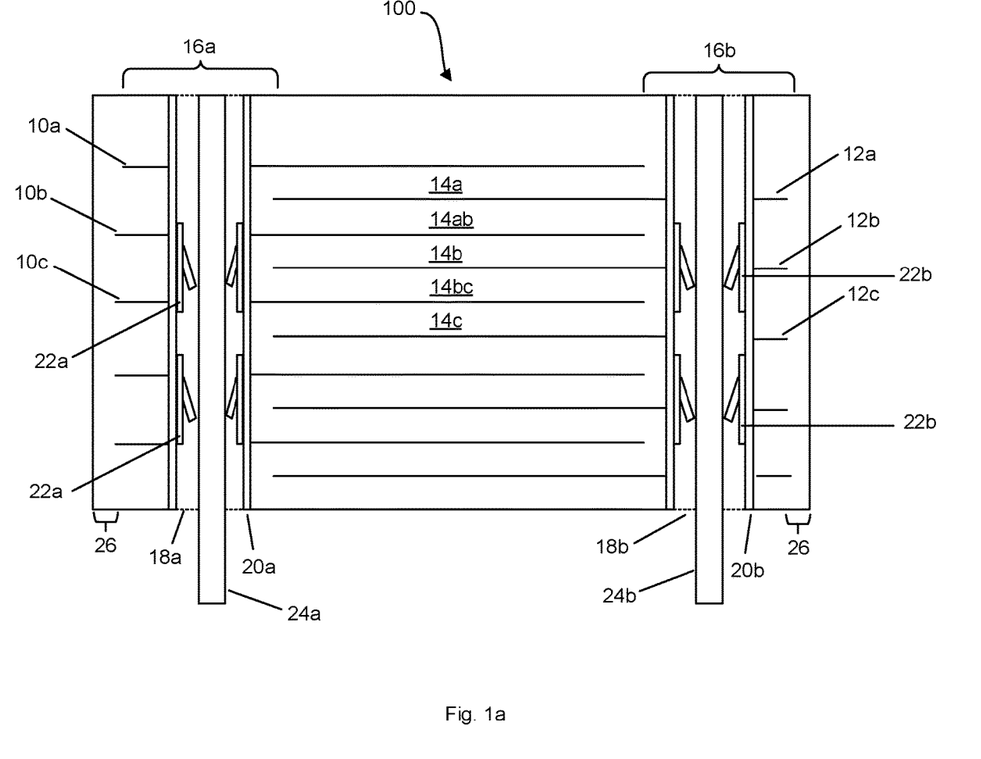
FIG. 1a is a cross-section through two electro-mechanical connections of a multi-layer capacitor in accordance with an embodiment of the solution, illustrating the internal structure of the electro-mechanical connections.
Figure 1B:
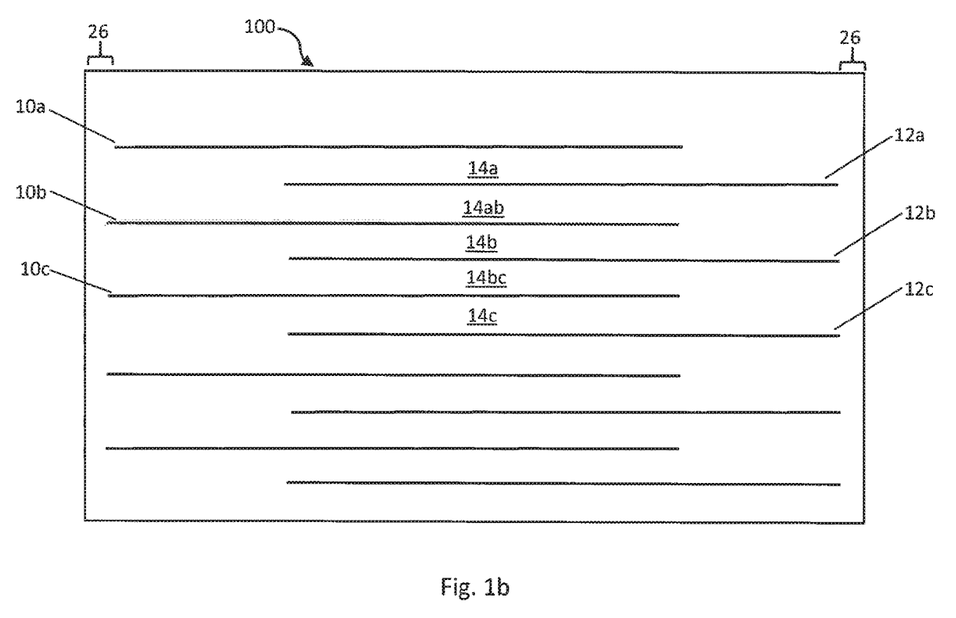
FIG. 1b is a further cross-section of the multi-layer capacitor of FIG. 1a, showing the internal structure of the capacitor away from the electro-mechanical connections.

FIG. 1b shows a first cross-section of the multi-layer capacitor 100, illustrating the general configuration of the electrodes and capacitance-forming layers. Multi-layer capacitor 100 is generally in the form of a ceramic body having electrodes 10a-10c and 12a-12c embedded therein. The electrodes comprise a first set of electrodes 10a, 10b, 10c which will be referred to herein as the anodes, and a second set of electrodes 12a, 12b, 12c, which will be referred to as the cathodes. The electrodes are in the form of planar layers. Electrodes 10a-10c and 12a-12c may be formed of any suitable conductive material, for example a metal such as gold, silver, or nickel.

The electrodes 10, 12 are arranged in a vertical stack. The electrodes 10a-10c and 12a-12c are arranged in an alternating fashion, forming pairs of anodes and cathodes (10a, 12a), (10b, 12b), (10c, 12c). A capacitance-forming layer of a dielectric 14a, 14ab, 14b, 14bc, 14c is arranged between each pair of electrodes. The thicknesses of the electrodes and capacitance-forming layers are not particularly limited, and may be selected as appropriate.

The body of multi-layer capacitor 100 is formed of the same material as the capacitance-forming layers 14a, 14ab, 14b, 14bc and 14c. The nature of the dielectric material is not particularly limited, with various materials useful for constructing multi-layer capacitors being known in the art. The dielectric material is typically a ceramic. An illustrative dielectric material comprises bismuth ferrite, strontium titanate and barium titanate, as is described in detail in WO2015/124698.

The body further includes an edge margin 26. Edge margin 26 is bulk dielectric material which surrounds the perimeters of the electrodes. In other words, in the illustrated example the electrodes do not extend to the edges of the body.

FIG. 1a is a cross-section of the multi-layer capacitor 100 which intersects a pair of the opposed holes 18a, 18b. The multi-layer capacitor 100 further includes electro-mechanical connections. Each electro-mechanical connection communicates with either the anodes 10a-10c or the cathodes 12a-12c, but not both because this would result in a short circuit. Each electro-mechanical connection includes a hole 18a or 18b, an electrical connector 22a or 22b, and a contact pin 24a or 24b.

The electro-mechanical connection for the anodes 10a-10c will now be considered in more detail. FIG. 1a shows that an electro-mechanical connection includes hole 18a, which extends through region 16a. Hole 18a passes through each of the anodes 10a, 10b, 10c, but does not pass through the cathodes 12a, 12b, 12c. In the present example, hole 18a is a through-hole which extends the full height of the multi-layer capacitor 100, from a top face to a bottom face. As will be described in more detail below, configuring hole 18a as a through-hole allows for multiple capacitors to be assembled together in a capacitor assembly.

A conductive coating 20a is provided on the bore of hole 18a. The conductive coating 20a connects electrically the anodes 10a, 10b, 10c. Coating 20a also provides electrical contact with the electrical connector 22a. In FIG. 1a, coating 20a takes the form of a conductive sleeve. The sleeve may be of any suitable conductive material, for example brass.

The electro-mechanical connection further includes an electrical connector 22a arranged in the hole 18a. The electrical connector 22a is in electrical communication with the anodes 10a, 10b, 10c, in this example via the conductive coating 20a. The electrical connector is configured to hold contact pin 24a.

The electrical connector 22a includes a compliant element, which in the example of FIG. 1a takes the form of a pair of compliant fingers. By 'compliant' it is meant that the element has a degree of flexibility, such that the contact pin may move relative to the body of the multi-layer capacitor 100. In other words, the element is resiliently flexible or 'springy'.

The flexibility of the compliant element mechanically decouples the body of the multi-layer capacitor 100 from contact pin 24a. This reduces the mechanical stresses experienced by the body, thereby protecting the body from damage. For example, if the multi-layer capacitor is mounted to a circuit board via the contact pin, and the circuit board experiences vibrations or physical impact, transmission of these mechanical forces to the body is reduced. The compliant element bends or flexes, reducing the transmission of mechanical stress.

The precise form of the electrical connector is not particularly limited, provided that the electrical connector connects electrically the associated electrodes to the contact pin, and mechanically decouples the contact pin from the multi-layer capacitor.

Decoupling the body of the multi-layer capacitor from physical stresses is expected to make it practical to increase the size of the multi-layer capacitor. It is contemplated that it would be possible to construct a useful multi-layer capacitor having length×width dimensions of up to about 5.1 cm×2.5 cm (i.e. 2"×1") or even up to about 7.6 cm×5.1 cm (3"×2") using the electrical terminations as described herein. Increasing the area of the multi-layer capacitor allows for higher capacitance and a higher voltage rating.

In the example shown in FIG. 1a, electrical connector 22a includes a hollow sleeve and compliant fingers extending into the sleeve. The sleeve of the electrical connector 22a holds the electrical connector 22a in the hole 18a via a friction fit. The sleeve is in electrical contact with the anodes 10 via the coating 20a of the hole 18a. The fingers of electrical connector 22a hold contact pin 24a via a friction fit. The fingers are resiliently flexible, thereby allowing motion of contact pin 24a relative to hole 18a.

Connector 22a is formed of a springy, conductive material. A preferred material is beryllium copper, which is also referred to in the art as copper beryllium, beryllium bronze, or spring copper. Beryllium copper is a copper alloy containing 0.5% to 3% beryllium by weight, the balance being copper. Other metals such as nickel and/or cobalt may also be included. Beryllium copper has good conductance and is resistant to repeated stress. Other materials may be used.

Connector 22a receives a contact pin 24a, and holds the contact pin 24a in the hole. In the present example, contact pin 24a is held by a friction fit, although any suitable technique could be used to couple a contact pin with the connector. The contact pin 24a is for connecting the multi-layer capacitor 100 to a further component of an electrical circuit. The further component may be in particular a printed circuit board. Contact pin 24a may be part of a socket provided on a printed circuit board.

The electrical termination for the cathodes 12a, 12b, 12c is of a similar construction to that for the anodes 10a, 10b, 10c. The electrical termination for the cathodes 12a, 12b, 12c includes a bore 18b, an electrical connector 22b, and a contact pin 24b. The hole 18b, electrical connector 22b and contact pin 24b have the same general construction as in the electrical termination for the anodes 10a, 10b, 10c, differing in that the bore 18b extends through the cathodes 12a, 12b, 12c rather than the anodes 10a, 10b, 10c.

As shown in FIG. 2a and 2b, the electromechanical connection for the anodes and the electro-mechanical connection for the cathodes each include a plurality of holes 18a and 18b, respectively. Each set of holes is arranged in a line toward an edge of the capacitor 100. Providing an electro-mechanical termination which includes a set of plural holes and electrical connectors allows improved dissipation of mechanical stresses. Providing plural holes also increases the surface area available for making electrical contact with the electrodes. FIG. 2a and 2b further illustrate that the termination for the anodes and the termination for the cathodes are arranged along opposed sides of the capacitor 100.

The capacitor includes regions 16a, 16b in which the anodes and cathodes do not overlap in plan. The anodes 10 and cathodes 12 are partially offset from one another in the horizontal direction to define the regions 16a, 16b. The non-overlapping regions are shaded in FIG. 2a. In this example, the electro-mechanical terminations are arranged in the non-overlapping regions.

FIG. 2b shows a further illustration of the non-overlapping regions.

A capacitor assembly may be constructed from the multi-layer capacitor described above. In the example shown in FIGS. 1a, 1b, 2a and 2b, the boreholes 18a, 18b are through holes extending through the full height of the capacitor. By arranging two or more such capacitors in a stack and aligning the holes, the capacitors may be connected together by inserting into the holes contact pins of a length selected to extend through the full height of the stack of capacitors. Such a capacitor assembly would have increased capacitance in comparison with a single capacitor.

In use, the multi-layer capacitor 100 is assembled into a circuit, for example by soldering contact pins 24a and 24b to a printed circuit board. The risk of component failure during assembly or during use of the resulting circuit is reduced, because the electro-mechanical connections reduce the transmission of mechanical stresses to the dielectric material. The multi-layer capacitors as described herein are particularly suitable for aerospace and automotive applications, since component failures caused by vibrations are a concern in these areas. The multi-layer capacitors are particularly useful for surge protection and ripple smoothing, and for use in electric vehicles.

Existing manufacturing techniques may be adapted to manufacture the multi-layer capacitors as described herein. For example, a screen printing process may be used. According to this process, compositions for forming capacitive layers and electrodes are screen printed to form a so-called green part. The bores may be formed by drilling the green part, before the part is fired. After firing, the remaining components of the electrical terminations may be inserted into the bores. Other techniques may be used.

Various modifications may be made to the multi-layer capacitor shown in FIGS. 1 and 2. Some illustrative modifications are described below. The described modifications may be incorporated into a capacitor in any appropriate combination.

Although the illustrated example shows that contact pins are present in the holes, the contact pins may be supplied separately and are not necessarily present.

Although the examples relate to a multi-layer capacitor, the same principles of construction may equally be applied to a single-layer capacitor. A single-layer variant would have one anode, one cathode, and one dielectric layer arranged therebetween.

The illustrated multi-layer capacitor 100 includes ten electrodes. The number of electrodes is however not particularly limited, and may be selected as appropriate. The number of electrodes may be varied depending on the required capacitance and the working voltage for the multi-layer capacitor, amongst other factors. The total number of electrodes is typically between 20 and 150.

The holes shown in the example extend through the full height of the multi-layer capacitor. This may be advantageous because through-holes can be readily formed by drilling, and the use of through-holes allows for the formation of a capacitor assembly comprising two or more capacitors. In a variant, the body may include a capping layer of bulk material through which the holes do not extend. The inclusion of a capping layer may be useful in multi-layer capacitors which are intended to be the top capacitor in an assembly, or which are to be used as single components. A capping layer may prevent dust or other contaminants from entering the holes.

In a further variant, a cap or plug may be fitted in one end of the hole, to provide protection against the ingress of dust or other contaminants. The cap may be, for example, an elastomeric cap having a recess for receiving an end of the contact pin.

The number of holes is not particularly limited, and may be selected as appropriate depending on, for example, the size of the multi-layer capacitor 100. For example, each electro-mechanical connection may include from one to ten holes, optionally three to seven holes.

The holes 18*a*, 18*b* in the example are generally cylindrical. Cylindrical holes are easily manufactured, since they may be formed by drilling, for example. The shape of the holes is however not particularly limiting. Other shapes may be used. For example, a hole might take the form of an elongate slot.

In the example, the holes pass through the electrodes to be terminated. This increases the area of the electrodes which is in contact with the hole, and may facilitate easier formation of electrical connections between the electrical connector in the hole and the electrodes. However, alternative configurations are possible. The hole may for example intersect an edge of the electrode to be terminated.

In the example, region 16*a*, 16*b* of no overlap between the anodes and cathodes are formed by a horizontal offset. However, alternative configurations are possible. For example, a region of no overlap may be achieved by the use of electrodes having a tab extending from one edge, which tab does not overlie the electrodes of the opposite polarity.

The illustrated holes 18*a* and 18*b* include conductive coatings 20*a* and 20*b*, respectively, arranged on their bores, which conductive coatings are in the form of sleeves. The nature of the conductive coating, where present, is however not particularly limited. For example, in a variant the surface of the bore is tinned with a layer of solder.

The conductive coating may be omitted in some variants. For example, in a variant a conductive epoxy resin or the like could be used to provide electrical communication between the electrodes and the electrical connector, without necessarily being in the form of a coating.

FIG. 1*a* and 1*b* show a single electrical connector disposed in each hole. The use of a plurality of electrical connectors in each hole is also contemplated. In the example, each hole receives a single contact pin. The number of contact pins per hole may be adjusted as appropriate depending on the configuration of the hole. By way of illustration, a hole in the form of an elongate slot might receive two or more contact pins, with the electrical connector or connectors being adapted to hold the two or more contact pins.

In the example, the connector is held in the hole via a friction fit and the contact pin is held in the connector via a friction fit. Either or both of these friction fits may be replaced by solder, adhesive, or any other appropriate fixing technique. In some variants, the electrical connector may be formed integrally with the contact pin and/or the conductive coating of the hole (if present), provided that the electrical connector is compliant and mechanically decouples the body from the contact pin.

Although the contact pin illustrated in the Example is a simple cylindrical member, in variants the contact pin may include one or more recesses, channels or the like configured to receive the compliant element of the electrical connector. The contact pin may alternatively or additionally include a projection for contacting the compliant element. The recess, channel, and/or projection may aid in holding the contact pin in a desired position e.g. by reducing slippage.

In the example, the contact pin is rigid. In a variant, the contact pin may be a compliant contact pin. The contact pin may provide some or all of the compliance which decouples mechanically the contact pin from the body of the capacitor.

The electro-mechanical connections described herein may be used in combination with other techniques for reducing the susceptibility of capacitive components to damage. For example, the body of the multi-layer capacitor may include a layer in which air acts to reduce the transmissibility of cracks through the multi-layer capacitor, as is described in WO2013/186172.

The form of the electrical connector is not limited to that shown in FIG. 1*a*. Various alternative electrical connectors are useful in the practice of the solution. Illustrative examples of such connectors are shown in FIGS. 3*a*, 3*b* and 4.

Figure 3A:
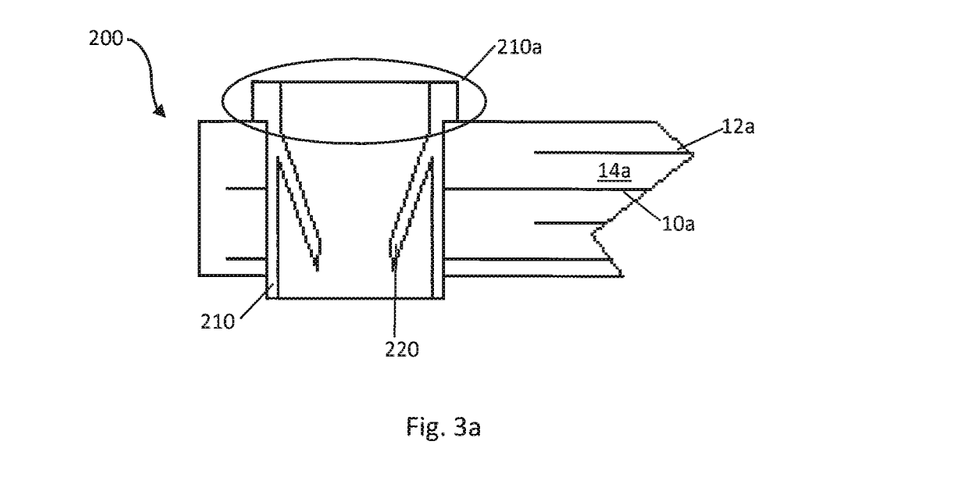
FIG. 3a is a partial cross-section of a multi-layer capacitor in accordance with an embodiment of the solution, showing details of a first example of an electrical connector.
Figure 4:
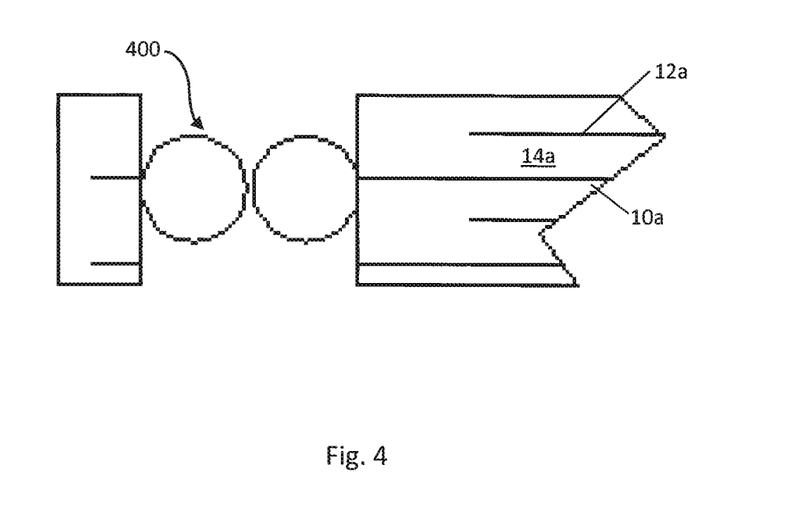
FIG. 4 is a partial cross-section of a multi-layer capacitor in accordance with an embodiment of the solution, showing a further example of an electrical connector.

FIG. 3*a* illustrates, in cross section, a second electrical connector 200. The electrical connector 200 includes a hollow sleeve 210 defining a volume. Compliant flaps 220 protrude from the sleeve portion 210 into the volume. Sleeve portion 210 includes an enlarged portion 210*a* (circled in FIG. 3*a*) at a first end of the sleeve, which enlarged portion has a diameter greater than an internal diameter of the hole of the multi-layer capacitor. When electrical connector 200 is inserted into the hole, the enlarged portion of sleeve 210 remains outside the hole. The enlarged portion of the sleeve is useful for positioning the electrical connector relative to the ceramic body of the capacitor. Electrical connector 200 also provides a socket on an outer surface of the multi-layer capacitor, which may guide insertion of a contact pin. To form the electro-mechanical connection, a contact pin may be inserted into the hollow sleeve. The contact pin is then held by the compliant flaps, which are compressed between the sleeve and the contact pin. Electrical connector 200 may be soldered into the hole in the body of the capacitor.

Figure 3B:
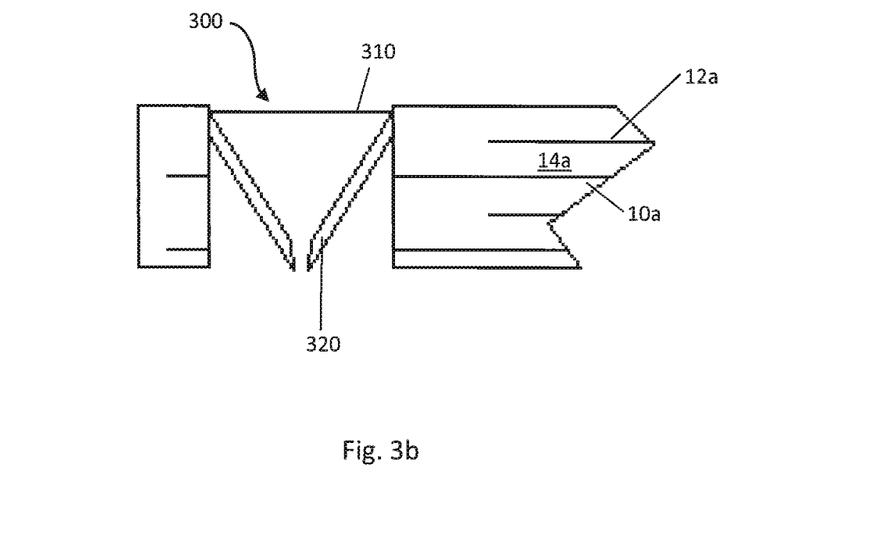

FIG. 3b shows a third example of an electrical connector 300. Similar to electrical connector 200, electrical connector 300 includes compliant flaps 320 for holding a contact pin. The structure of electrical connector 300 however differs from that of electrical connector 200 in that electrical connector 300 does not include a sleeve. Instead, a wire loop 310 connects together the compliant flaps. Connector 300 is thus in the form of a spring clip.

It is contemplated that electrical connector 200 of FIG. 3a may be used in combination with electrical connector 300 of FIG. 3b. An electrical connector having a sleeve with an enlarged portion 200 may be fitted into the or each end of the hole, with one or more further electrical connectors 300 being arranged inside the hole. Providing multiple electrical connectors may improve the contact to the contact pin, and may provide further resistance to inadvertent removal of the contact pin, while still allowing the contact pin to move relative to the ceramic body of the multi-layer capacitor.

A still further example of an electrical connector 400 is shown in FIG. 4. Electrical connector 400 is a canted coil spring. Canted coil spring 400 is in the form of a helical spring which is arranged in a loop. The canted coil spring is arranged to be deformable when a radial force is applied to the spring. This provides the mechanical decoupling. When assembling the capacitor, canted coil spring 400 may be inserted into the capacitor under compression, such that the spring provides an expansion force for holding the spring in the hole. Canted spring connectors are sometimes referred to in the art as "grounding rings", however in the context of the present disclosure the connector is used to provide a live connection to the electrodes of the capacitor, as opposed to grounding.

Another example of an electrical connector comprises an elongate sleeve defining a volume, and compliant fingers extending from the sleeve into the volume. Such a connector combines together the functionalities of the electrical coating 20b and the electrical connector 22b as shown in FIG. 1a. Such a connector might include a plurality of sets of compliant flaps.

It is also contemplated that the hole of the multi-layer capacitor may be coated with a compressible conductive material, e.g. a flexible conductive polymer. This would allow the coating to act as both the electrical contact to the electrodes and to hold the contact pin while allowing the contact pin to move relative to the body of the capacitor.

Also provided herein is a kit for assembling a multi-layer capacitor. The kit comprises a capacitor as described herein in a disassembled state, that is, with the capacitor body provided separately from the electrical connector. As will be readily appreciated, the features described with reference to the assembled multi-layer capacitor may also be incorporated into the kit.

The invention claimed is:

1. A capacitor comprising:
    a body of dielectric material in which an anode and a cathode are arranged in a stack, wherein the anode and the cathode overlap and are laterally offset to define a portion of the anode that does not overlap the cathode and a portion of the cathode that does not overlap the anode;
    a capacitance-forming layer of the dielectric material arranged between the anode and the cathode in the stack, wherein the capacitance-forming layer separates overlapping portions of the anode and the cathode;
    an electro-mechanical connection for the anode comprising:
        a first hole which extends into the body in the direction of the stack and through the portion of the anode that does not overlap the cathode, the first hole including a first electrical connector, wherein the first electrical connector is in electrical contact with the anode; and
    an electro-mechanical connection for the cathode, comprising:
        a second hole which extends into the body in the direction of the stack and through the portion of the cathode that does not overlap the anode, the second hole including a second electrical connector, wherein the second electrical connector is in electrical contact with the cathode,
    wherein each of the first and second electrical connectors comprises a respective hollow sleeve portion defining a volume and a respective compliant element having a respective free end and protruding from the respective sleeve portion into the volume, the respective compliant element having a dimension in the direction of the stack that is greater than a thickness of the capacitance-forming layer, the respective compliant element is configured to hold a respective contact pin and decouple the body from mechanical forces applied to the respective contact pin when holding the respective contact pin.

2. The capacitor according to claim 1, comprising a plurality of anodes, a plurality of cathodes, and a plurality of capacitance-forming layers of the dielectric material.

3. The capacitor according to claim 1,
    wherein the electro-mechanical connection for the anode and the electro-mechanical connection for the cathode each includes a plurality of holes extending into the body in the direction of the stack, the holes being provided with respective electrical connectors.

4. The capacitor according to claim 3, wherein the electro-mechanical connection for the anode and the electro-mechanical connection for the cathode are arranged along opposed edges of the capacitor.

5. The capacitor according to claim 1, wherein the body includes an edge margin surrounding perimeters of the anode and the cathode.

6. The capacitor according to claim 1, wherein the first and second holes have electrically-conductive bores.

7. The capacitor according to claim 1, wherein two or more electrical connectors are arranged in the first hole of the electro-mechanical connection for the anode or in the second hole of the electro-mechanical connection for the cathode.

8. The capacitor according to claim 1, wherein the first and second holes are through-holes extending between a top face of the body and a bottom face of the body.

9. A capacitor assembly comprising two or more capacitors as defined in claim 8 arranged in a stack, wherein first holes of the capacitors are aligned along a first common axis, second holes of the capacitors are aligned along a second common axis, a first common contact pin extends through the aligned first holes, and a second common contact pin extends through the aligned second holes, the first and second common contact pins to connect together the one or more capacitors.

10. A kit for assembling a capacitor, which kit comprises:
a capacitive component;
first and second electrical connectors; and
first and second contact pins;
wherein the capacitive component comprises:
   a body of dielectric material in which an anode and a cathode are arranged in a stack, wherein the anode and the cathode overlap and are laterally offset to define a portion of the anode that does not overlap the cathode and a portion of the cathode that does not overlap the anode;
   a capacitance-forming layer of the dielectric material arranged between the anode and the cathode in the stack, wherein the capacitance-forming layer separates overlapping portions of the anode and the cathode;
   a first hole extending into the body in the direction of the stack and through a portion of the anode that does not overlap the cathode; and
   a second hole which extends into the body in the direction of the stack and through a portion of the cathode that does not overlap the anode;
wherein the first electrical connector is capable of being arranged in the first hole in electrical contact with the anode and is suitable for holding the first contact pin in the first hole,
wherein the second electrical connector is capable of being arranged in the second hole in electrical contact with the cathode and is suitable for holding the second contact pin in the second hole, and
wherein each of the first and second electrical connectors comprises a respective hollow sleeve portion defining a volume and a respective compliant element having a respective free end and protruding from the respective sleeve portion into the volume, the respective compliant element having a dimension in the direction of the stack that is greater than a thickness of the capacitance-forming layer, the respective compliant element is configured to hold a respective contact pin among the first and second contact pins, in the capacitive component, and decouple the body from mechanical forces applied to the respective contact pin when holding the respective contact pin.

11. The kit according to claim 10, wherein the first and second holes are through holes and the first and second contact pins have respective lengths greater than twice a height of the capacitive component, such that the first and second contact pins are capable of extending through two or more capacitive components arranged in a stack.

* * * * *